(12) United States Patent
Hashida et al.

(10) Patent No.: US 11,701,958 B2
(45) Date of Patent: Jul. 18, 2023

(54) ELECTRIC POWERED VEHICLE

(71) Applicants: TOYOTA JIDOSHA KABUSHIKI KAISHA, Aichi (JP); SUBARU CORPORATION, Tokyo (JP)

(72) Inventors: Shigenori Hashida, Nisshin (JP); Osamu Shimasaki, Nisshin (JP); Daisuke Suewaka, Tokyo-to (JP); Satoshi Ikeda, Tokyo-to (JP)

(73) Assignees: TOYOTA JIDOSHA KABUSHIKI KAISHA, Aichi (JP); SUBARU CORPORATION, Tokyo (JP)

(*) Notice: Subject to any disclaimer, the term of this patent is extended or adjusted under 35 U.S.C. 154(b) by 217 days.

(21) Appl. No.: 17/229,870

(22) Filed: Apr. 14, 2021

(65) Prior Publication Data

US 2021/0347241 A1 Nov. 11, 2021

(30) Foreign Application Priority Data

May 11, 2020 (JP) .................................. 2020-083479

(51) Int. Cl.
*B60K 1/04* (2019.01)
*B62D 21/11* (2006.01)
*B62D 27/06* (2006.01)
*B62D 25/14* (2006.01)

(52) U.S. Cl.
CPC ................ *B60K 1/04* (2013.01); *B62D 21/11* (2013.01); *B62D 25/14* (2013.01); *B62D 27/06* (2013.01); *B60K 2001/0438* (2013.01)

(58) Field of Classification Search
CPC .............. B60K 1/04; B60K 2001/0438; B60K 2001/0405; B62D 21/11; B62D 25/14; B62D 27/06; B62D 21/155; B62D 27/065; B62D 21/09; B62D 21/152; B60Y 2306/01
See application file for complete search history.

(56) References Cited

U.S. PATENT DOCUMENTS 9,352,785 B2 * 5/2016 Winberg ................ B62D 21/11
10,442,473 B2 * 10/2019 Erlacher ............. H01M 50/262
11,046,365 B2 * 6/2021 Rosepiler ............... B62D 21/11
(Continued)

FOREIGN PATENT DOCUMENTS

CN 110395099 A * 11/2019 .............. B60K 1/04
CN 110395099 A 11/2019
(Continued)

*Primary Examiner* — James A Shriver, II
*Assistant Examiner* — Michael T. Walsh
(74) *Attorney, Agent, or Firm* — Hauptman Ham, LLP (57) ABSTRACT

An electric powered vehicle including a traction motor is disclosed. The vehicle may further include a body including a cabin and a front body; a subframe mounted at a lower portion of the front body and supporting a suspension along with the front body; and a battery unit mounted a t a lower portion of the cabin and configured to supply electric power to the traction motor. The subframe may include a side rail extending in front-rear directions of the electric powered vehicle and is secured to a rail mount portion of the body at a rear end of the side rail. The battery unit may include a bracket projecting in a front direction of the front-rear directions and is secured to the rail mount portion of the body at the bracket.

16 Claims, 5 Drawing Sheets

(56) References Cited

U.S. PATENT DOCUMENTS

| | | | |
|---|---|---|---|
| 11,524,723 B2 * | 12/2022 | Eklund | ................ B62D 29/008 |
| 2018/0312198 A1 * | 11/2018 | Shimizu | ................... B60K 1/04 |
| 2019/0002026 A1 | 1/2019 | Ayukawa | |
| 2019/0322164 A1 * | 10/2019 | Sasaki | .................. B62D 21/155 |

FOREIGN PATENT DOCUMENTS

| | | | |
|---|---|---|---|
| DE | 102018113855 A1 * | 12/2018 | ............... B60K 1/04 |
| JP | 201910999 A | 1/2019 | |
| JP | 2019156029 A * | 9/2019 | ............... B60K 1/04 |
| JP | 2019-188899 A | 10/2019 | |
| JP | 2019188899 A * | 10/2019 | ............... B60K 1/04 |
| WO | WO-2014038346 A1 * | 3/2014 | ............... B60K 1/04 |

\* cited by examiner

ELECTRIC POWERED VEHICLE

CROSS-REFERENCE TO RELATED APPLICATION

This application claims priority to Japanese Patent Application No. 2020-083479, filed on May 11, 2020, the entire contents of which are incorporated herein by reference.

TECHNICAL FIELD

The technique disclosed herein relates to an electric powered vehicle including a traction motor.

BACKGROUND

Japanese Patent Application Publication No. 2019-10999 describes an electric powered vehicle. This electric powered vehicle is provided with a body including a cabin and a front body, a subframe mounted at a lower portion of the front body and supporting a suspension along with the front body, and a battery unit mounted at a lower portion of the cabin and configured to supply electric power to a traction motor. The subframe includes a side rail extending in front-rear directions of the electric powered vehicle and is secured to the body at a plurality of positions including a rear end of the side rail.

SUMMARY

In the above-described electric powered vehicle, the battery unit is disposed rearward of the subframe. In this configuration, the battery unit could be damaged by the subframe moving rearward upon a frontal collision to the electric powered vehicle. To avoid this, a secured portion between the subframe and the body, especially a secured portion between the rear end of the side rail and the body is desirably fractured upon a frontal collision to the electric powered vehicle, such that the rear end of the side rail is separated from the body. In order to assure the fracture at the secured portion between the rear end of the side rail and the body upon a collision, strength of the body (strength to withstand plastic deformation) is required to be high at the secured portion. That is, if the strength of the body is insufficient, the secured portion between the rear end of the side rail and the body is not fractured and the body may be plastically deformed. The body may have a robust structure to increase its strength, however, this leads to an increase in the weight of the body.

In view of the above, the disclosure herein provides a technique of protecting a battery unit from a subframe upon a frontal collision without increasing the weight of a body.

The technique disclosed herein is embodied as an electric powered vehicle including a traction motor. This electric powered vehicle may comprise a body comprising a cabin and a front body; a subframe mounted at a lower portion of the front body and supporting a suspension along with the front body; and a battery unit mounted at a lower portion of the cabin and configured to supply electric power to the traction motor. The subframe may comprise a side rail extending in front-rear directions of the electric powered vehicle and may be secured to a rail mount portion of the body at a rear end of the side rail. The battery unit may comprise a bracket projecting in a front direction of the front-rear directions and may be secured to the rail mount portion of the body at the bracket.

In the above-described electric powered vehicle, the rear end of the side rail of the subframe is secured to the rail mount portion of the body, and the bracket of the battery unit is also secured to the rail mount portion. In this configuration, the rail mount portion of the body is supported by the bracket of the battery unit, by which the strength of the body at the rail mount portion can be substantially increased without any change to a structure of the body itself. Thus, upon a frontal collision to the electric powered vehicle, the secured portion between the rear end of the side rail and the rail mount portion of the body can be easily fractured and the rear end of the side rail can be further ensured to separate from the body.

DETAILED DESCRIPTION

In one embodiment of the technique disclosed herein, at least a part of a rear end face of the side rail may face a front end face of the bracket of the battery unit in the front-rear directions. In this configuration, the rear end of the side rail and the bracket of the battery unit are in a positional relationship that they are arranged in the front-rear directions. Thus, the bracket of the battery unit can receive most of a collision load inputted to the rail mount portion from the side rail. This further increases the strength of the rail mount portion, therefore the rear end of the side rail can be further ensured to separate from the body upon a collision to the electric powered vehicle.

In the above-described embodiment, the rear end face of the side rail of the subframe may be offset with respect to the front end face of the bracket of the battery unit at least in either one of an up direction or a down direction of up-down directions of the electric powered vehicle. Upon a frontal collision to the electric powered vehicle, this configuration allows the rear end of the side rail that has separated from the rail mount portion of the body to contact the bracket of the battery unit, by which the rear end of the side rail is deflected above or below the battery unit.

In the above-described embodiment, the rear end face of the side rail of the subframe may be offset with respect to the front end face of the bracket of the battery unit at least in the down direction of the up-down directions. Upon a frontal collision to the electric powered vehicle, this configuration allows the rear end of the side rail that has separated from the rail mount portion of the body to contact the bracket of the battery unit, by which the rear end of the side rail is deflected below the battery unit. Below the battery unit, there is a space between the electric powered vehicle and a road surface. Since the rear end of the side rail is guided to that space, secondary damage which could be caused by the separation of the side rail can be avoided.

In addition to or in place of the above, the rear end face of the side rail of the subframe may be offset with respect to the front end face of the bracket of the battery unit at least in either one of a right direction or a left direction of right-left directions of the electric powered vehicle. Upon a frontal collision to the electric powered vehicle, this configuration allows the rear end of the side rail that has separated from the rail mount portion of the body to contact the bracket of the battery unit, by which the rear end of the side rail is deflected to left or right with respect to the battery unit.

In the above-described embodiment, the rear end face of the side rail of the subframe may be offset outward with respect to the front end face of the bracket of the battery unit outwardly in the one of the right direction or the left direction of the right-left directions (i.e., width direction of the electric powered vehicle). Upon a frontal collision to the electric powered vehicle, this configuration allows the rear end of the side rail that has separated from the rail mount portion of the body to contact the bracket of the battery unit, by which the rear end of the side rail is deflected toward the outside of the electric powered vehicle. Major frame members of the body, such as side sills (also called rockers), are disposed on outer right and left sides of the battery unit. Therefore, in the configuration where the rear end face of the side rail of the subframe is offset outward with respect to the front end face of the bracket of the battery unit in the right direction or the left direction, the major frame members of the body, such as the side sills, can receive a collision load inputted to the body from the rear end of the side rail.

In one embodiment of the technique disclosed herein, an area of a part of the rear end face of the side rail of the subframe that faces the front end face of the bracket of the battery unit in the front-rear directions may be at most a half of a total area of the rear end face. In this positional relationship, when moving rearward (i.e., moving toward the battery unit), the rear end of the side rail partially contacts the bracket, by which the rear end of the side rail can be significantly deflected from the battery unit. In another embodiment, the aforementioned area of a part of the rear end face that faces the front end face may be at most a quarter or one-eighth of the total area of the rear end face.

In one embodiment of the technique disclosed herein, the rear end of the side rail of the subframe may be thinner than other part of the side rail. This configuration facilitates deformation of the rear end of the side rail upon a frontal collision to the electric powered vehicle, thus deformation of the rail mount portion of the body can be mitigated. Therefore, the secured portion between the rear end of the side rail and the rail mount portion of the body can easily fracture and the rear end of the side rail can be ensured to separate from the body.

In one embodiment of the technique disclosed herein, the rear end of the side rail of the subframe may be secured to the rail mount portion of the body with a bolt. In this case, a spacer (e.g., at least one collar and/or washer) through which the bolt passes may be provided between the rear end of the side rail of the subframe and the rail mount portion of the body. This configuration can surely fracture the bolt which secures the rear end of the side rail to the rail mount portion of the body upon a frontal collision to the electric powered vehicle.

In one embodiment of the technique disclosed herein, the rail mount portion of the body may be disposed on a dash crossmember of the body. In this case, the rail mount portion may be integrated with the dash crossmember or may be attached to the dash crossmember, for example, by welding.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric powered vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

Figure 1:
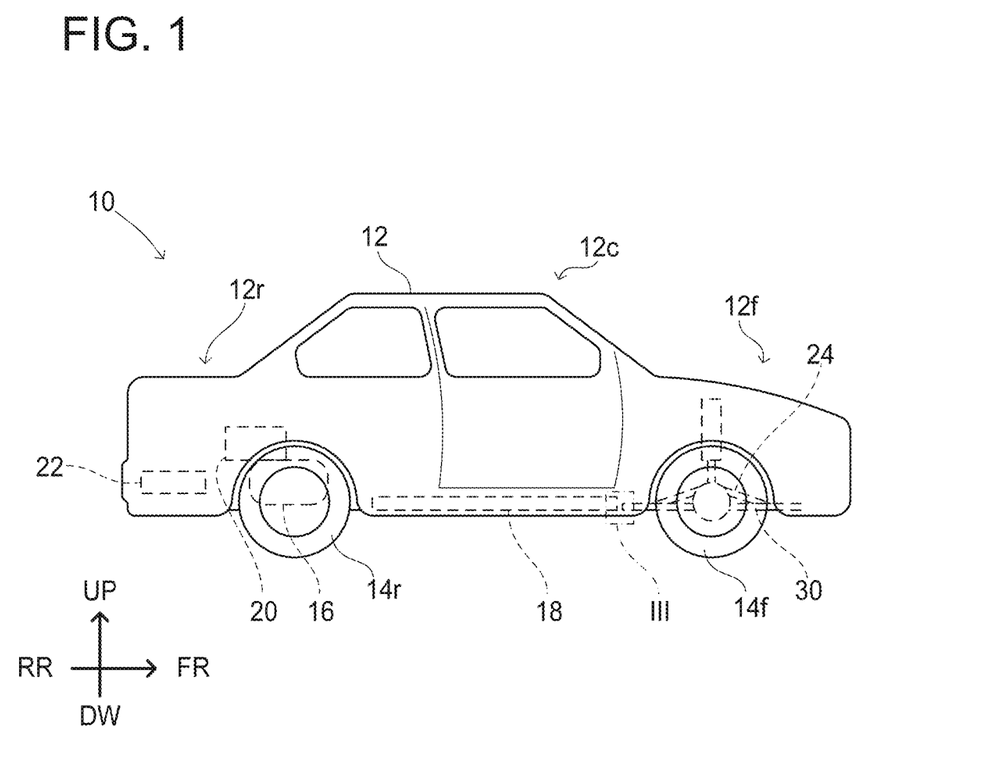
FIG. 1 schematically shows an electric powered vehicle 10 according to an embodiment.

An electric powered vehicle 10 according to an embodiment will be described with reference to the drawings. As shown in FIG. 1, the electric powered vehicle 10 includes a body 12 and a plurality of wheels 14*f*, 14*r*. The body 12 is constituted of metal such as a steel material or aluminum alloy, although not limited thereto. The plurality of wheels 14*f*, 14*r* is rotatably attached to the body 12. The plurality of wheels 14*f*, 14*r* includes a pair of front wheels 14*f* and a pair of rear wheels 14*r*. The number of wheels 14*f*, 14*r* is not limited to four.

The electric powered vehicle 10 further includes a traction motor 16, a battery unit 18, a power control unit 20 (PCU 20), and an electronic control unit 22 (ECU 22). The traction motor 16 is configured to drive at least one of the plurality of wheels 14*f*, 14*r* (e.g., the pair of rear wheels 14*r*). The battery unit 18 is connected to the traction motor 16 via the PCU 20 and is configured to supply electric power to the traction motor 16. The battery unit 18 includes a plurality of secondary cells therein and is configured to be recharged repeatedly with external electrical power. The PCU 20 includes a DC-DC converter and/or an inverter therein and is configured to control the electric power transmitted between the battery unit 18 and the traction motor 16. The ECU 22 includes a processor and is configured to give control commands to the PCU 20 according to operations by a user, for example. The electric powered vehicle 10 may include other power source(s), such as a fuel cell unit and/or a solar panel, in addition to the battery unit 18. Further, the electric powered vehicle 10 may further include another prime mover, such as an engine, in addition to the traction motor 16.

In the drawings, FR indicates a front direction of front-rear directions of the electric powered vehicle 10, and RR indicates a rear direction of the front-rear directions of the electric powered vehicle 10. Further, LH indicates a left direction of right-left directions (or width directions) of the electric powered vehicle 10, and RH indicates a right direction of the right-left directions of the electric powered vehicle 10. Then, UP indicates an up direction of up-down directions of the electric powered vehicle 10, and DW indicates a down direction of the up-down directions of the electric powered vehicle 10. It should be noted that in the disclosure herein, the front-rear directions of the electric powered vehicle 10, the right-left directions of the electric powered vehicle 10, and the up-down directions of the electric powered vehicle 10 may be simply termed the front-rear directions, the right-left directions, and the up-down directions, respectively.

As shown in FIG. 1, the body 12 generally includes a front body 12*f*, a cabin 12*c*, and a rear body 12*r*. The front body 12*f* is positioned forward of the cabin 12*c*, and the rear body 12*r* is positioned rearward of the cabin 12*c*. A subframe 30 is mounted at a lower portion of the front body 12*f*. The subframe 30 supports a suspension 24 of the wheels 14*f* along with the front body 12*f*. The subframe 30 is constituted of metal such as a steel material or aluminum alloy, although not limited thereto. The aforementioned battery unit 18 is mounted at a lower portion of the cabin 12*c*.

Figure 2:
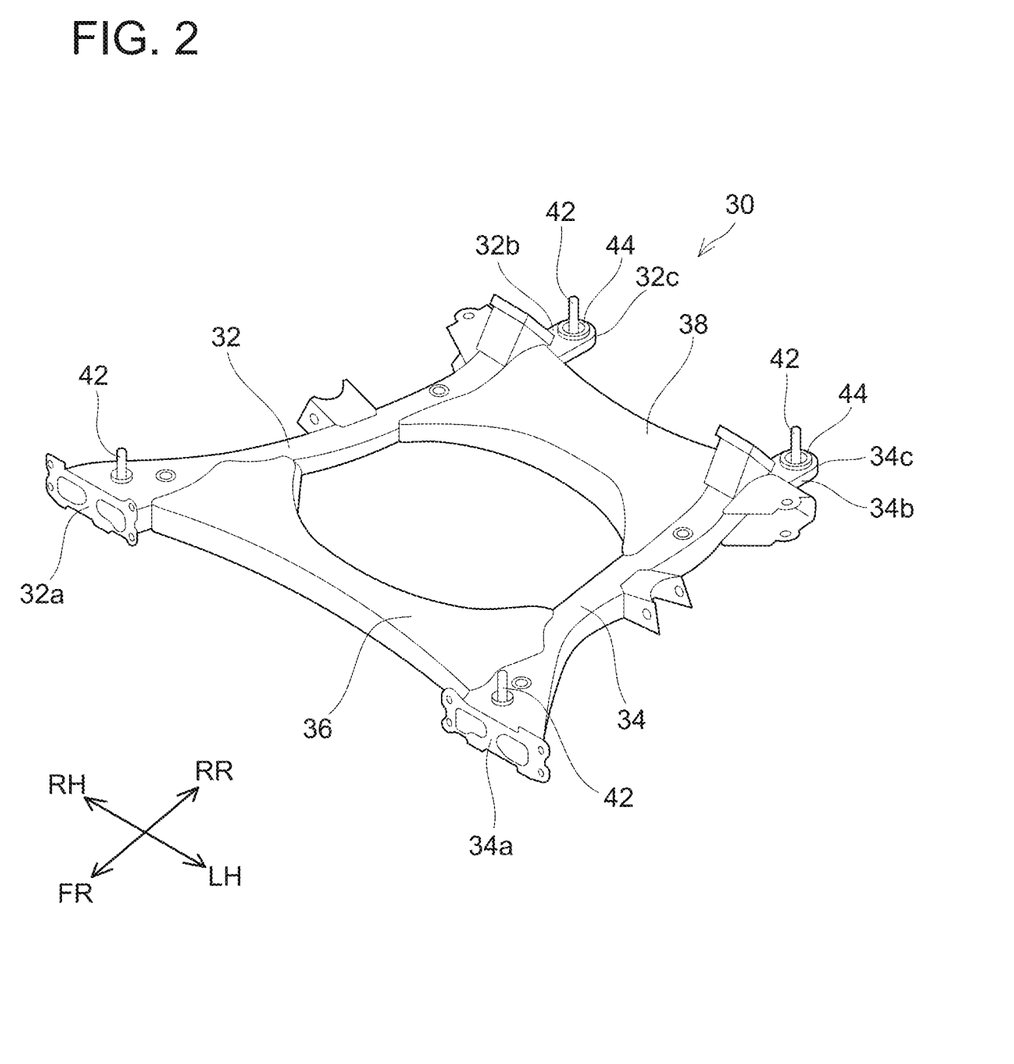
FIG. 2 shows a perspective view of a subframe 30.

As shown in FIG. 2, the subframe 30 has a substantially frame shape, and includes a pair of a right side rail 32 and a left side rail 34 and a front crossmember 36 and a rear crossmember 38 that extend between the right and left side rails 32, 34. The right side rail 32 and the left side rail 34 has symmetric shapes with respect to the right-left directions and extend along the front-rear directions of the vehicle. Although not shown, a bumper reinforcement is attached to front ends 32*a*, 34*a* of the two side rails 32, 34 via respective crush boxes. No limitation is placed on specific shapes and structures of the two side rails 32, 34.

The subframe 30 is secured to the body 12 at a plurality of secured portions including the front end 32*a* and a rear end 32*b* of the right side rail 32 and the front end 34*a* and a rear end 34*b* of the left side rail 34. The subframe 30 is provided with a plurality of bolts 42 and is secured to the body 12 using these bolts 42, although not limited thereto. Further, the subframe 30 is provided with collars 44 for respective bolts 42. Each collar 44 is an example of tubular spacer. Each bolt 42 extends and passes through corresponding one of the collars 44. The collars 44 are positioned between the subframe 30 and the body 12, with the subframe 30 mounted on the body 12. These collars 44 may be integrated with the subframe 30 or may be separate parts from the subframe 30.

Figure 3:
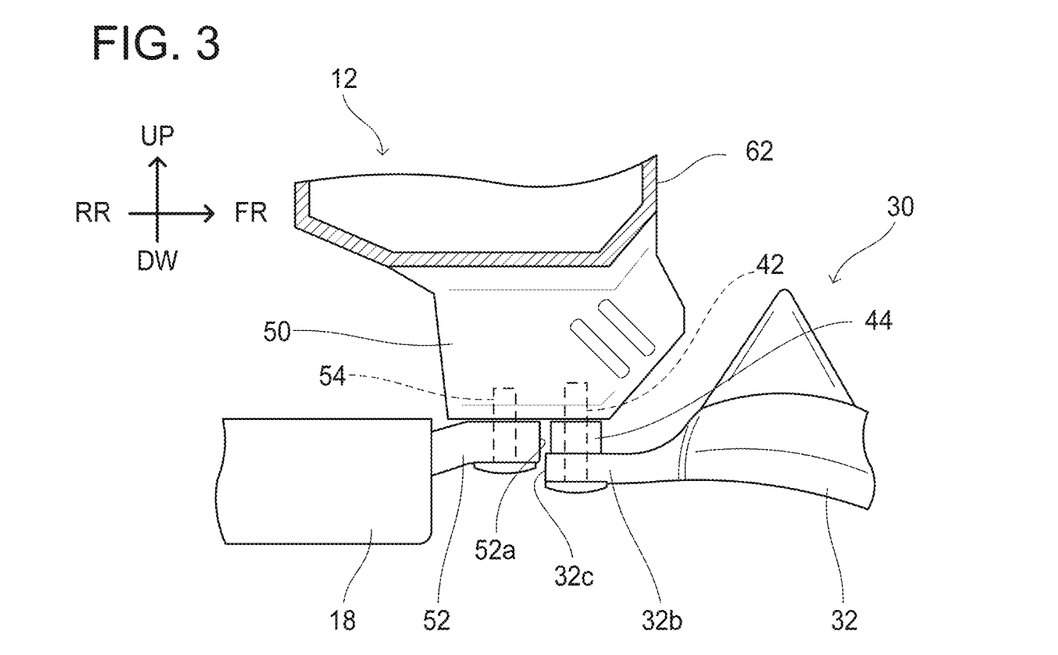
FIG. 3 shows a positional relationship, at a first rail mount portion 50 of a body 12, between a rear end 32b of a right side rail 32 of the subframe 30 and a first bracket 52 of a battery unit 18 when they are seen in a side view.
Figure 4:
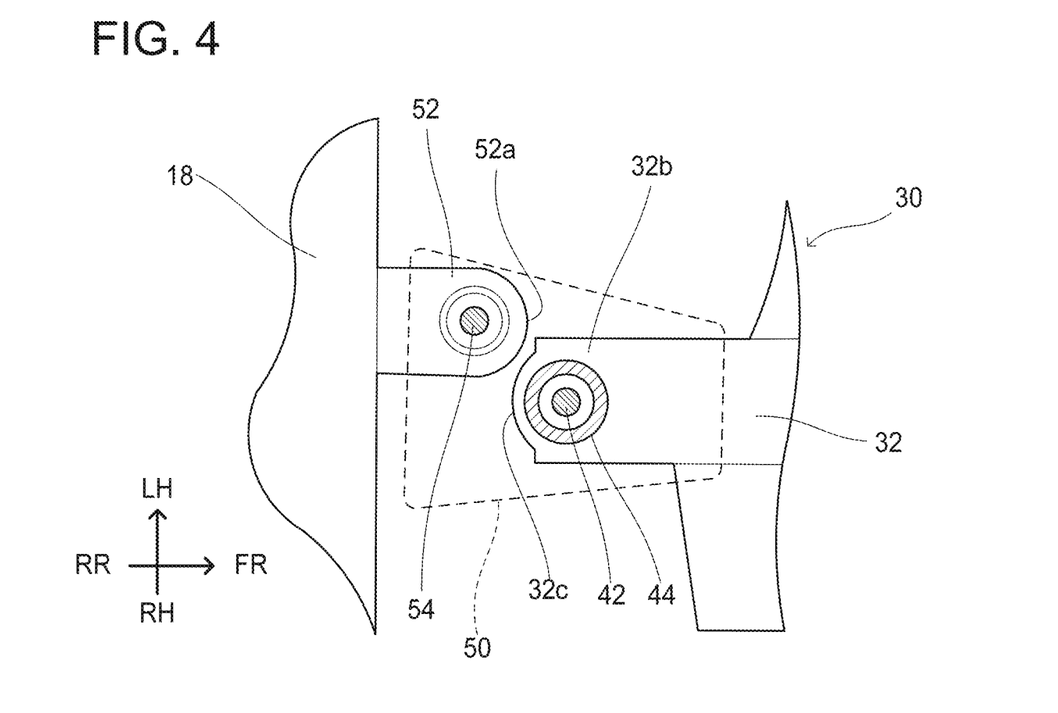
FIG. 4 shows a positional relationship, at the first rail mount portion 50 of the body 12, between the rear end 32b of the right side rail 32 of the subframe 30 and the first bracket 52 of the battery unit 18 when they are seen in a plan view.

As shown in FIGS. 3 and 4, the rear end 32*b* of the right side rail 32 of the subframe 30 is secured to a first rail mount portion 50 provided on the body 12. A first bracket 52 provided on the battery unit 18 is also secured to the first rail mount portion 50. The first bracket 52 extends in the front direction from the battery unit 18 and is secured to the first rail mount portion 50, for example, with a bolt 54. As above, the rear end 32*b* of the right side rail 32 as well as the first bracket 52 of the battery unit 18 is secured to the first rail mount portion 50 of the body 12.

The rear end 32*b* of the right side rail 32 is proximate to the first bracket 52 of the battery unit 18, while it is offset with respect to the first bracket 52 in either one of the up direction or the down direction and/or in either one of the right direction or the left direction. Specifically, a rear end face 32*c* of the right side rail 32 is offset with respect to a front end face 52*a* of the first bracket 52 in the down direction of the front-rear directions. Further, the rear end face 32*c* of the right side rail 32 is offset with respect to the front end face 52*a* of the first bracket 52 of the battery unit 18 in the right direction of the right-left directions (i.e., outwardly). Thus, only a part of the rear end face 32*c* of the right side rail 32 faces the front end face 52*a* of the first bracket 52 of the battery unit 18 in the front-rear directions.

Figure 5:
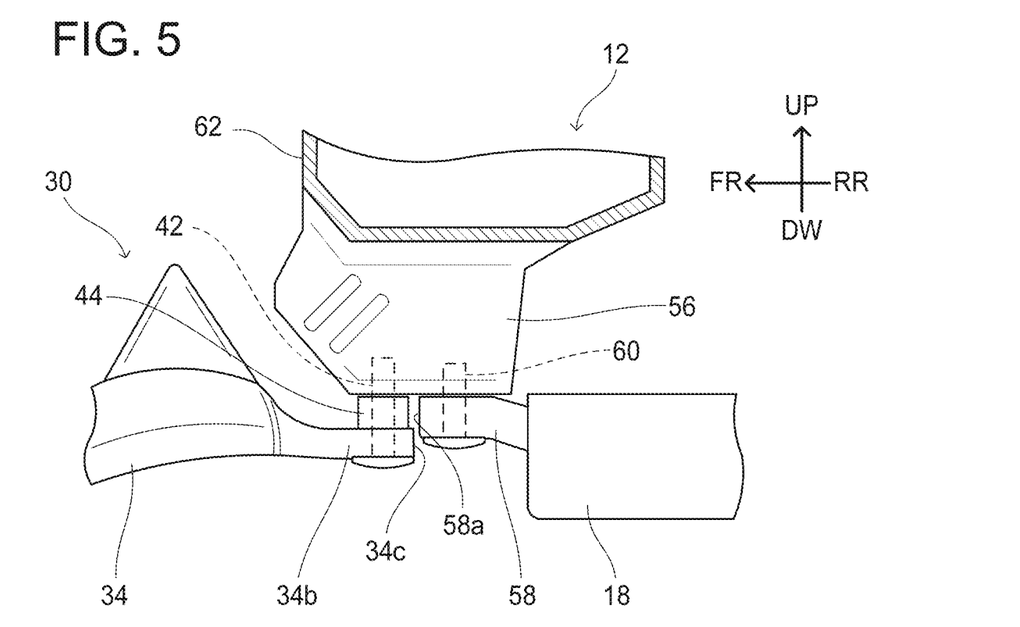
FIG. 5 shows a positional relationship, at a second rail mount portion 56 of the body 12, between a rear end 34b of a left side rail 34 of the subframe 30 and a second bracket 58 of the battery unit 18 when they are seen in a side view.
Figure 6:
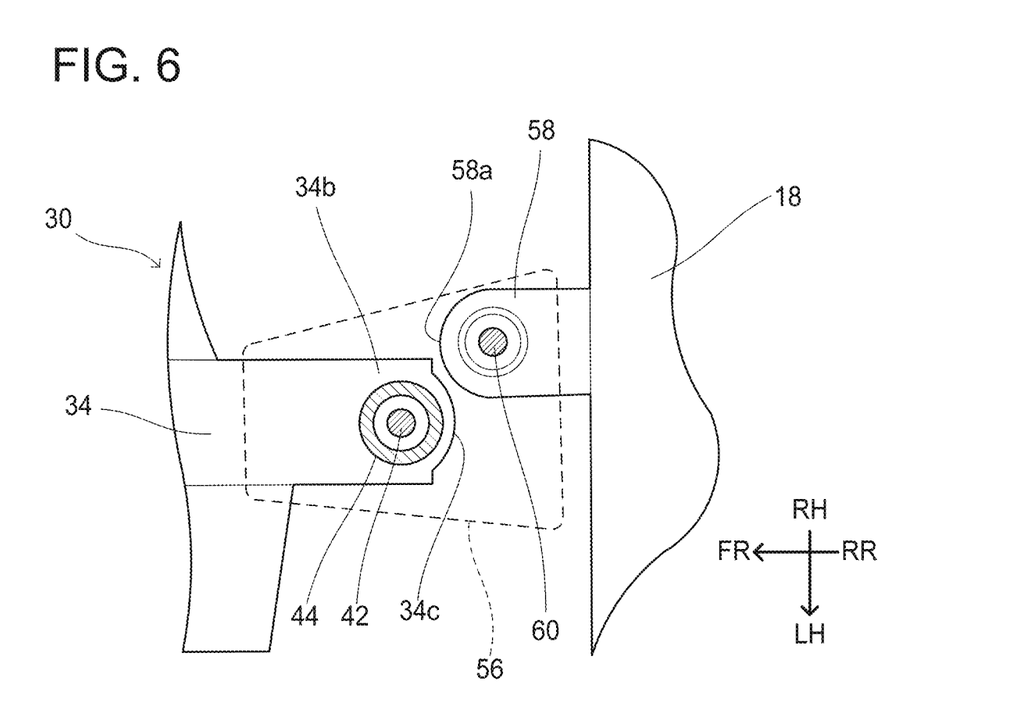
FIG. 6 shows a positional relationship, at the second rail mount portion 56 of the body 12, between the rear end 34b of the left side rail 34 of the subframe 30 and the second bracket 58 of the battery unit 18 when they are seen in a plan view.

As shown in FIGS. 5 and 6, the rear end 34*b* of the left side rail 34 of the subframe 30 is secured to a second rail mount portion 56 provided on the body 12. A second bracket 58 provided on the battery unit 18 is also secured to the second rail mount portion 56. Similar to the first bracket 52, the second bracket 58 extends in the front direction from the battery unit 18 and is secured to the second rail mount portion 56, for example, with a bolt 60. As above, the rear end 34*b* of the left side rail 34 as well as the second bracket 58 of the battery unit 18 is secured to the second rail mount portion 56 of the body 12.

The rear end 34*b* of the left side rail 34 is proximate to the second bracket 58 of the battery unit 18, while it is offset with respect to the second bracket 58 in either one of the up direction or the down direction and/or either one of the right direction or the left direction. Specifically, a rear end face 34*c* of the left side rail 34 is offset with respect to a front end face 58*a* of the second bracket 58 of the battery unit 18 in the down direction of the up-down directions. Further, the rear end face 34*c* of the left side rail 34 is offset with respect to the second bracket 58 of the battery unit 18 in the left direction of the right-left directions (i.e., outwardly). Thus, only a part of the rear end face 34*c* of the left side rail 34 faces the front end face 58*a* of the second bracket 58 of the battery unit 18 in the front-rear directions.

In the electric powered vehicle 10 according to the present embodiment, the battery unit 18 is located rearward of the subframe 30. In this configuration, the battery unit 18 may be damaged by the subframe 30 moving rearward upon a frontal collision of the electric powered vehicle 10. To avoid this, the secured portion between the rear end 32*b* of the side rail 32 and the rail mount portion 50 of the body and the secured portion between the rear end 34*b* of the side rail 34 and the rail mount portion 56 of the body 12 are desirably fractured upon a frontal collision to the electric powered vehicle 10, such that the rear ends 32*b*, 34*b* of the side rails 32, 34 are separated from the body 12. However, if the strength of the rail mount portions 50, 56 (strength to withstand plastic deformation) is insufficient, the secured portions between the rear ends 32*b*, 34*b* of the side rails 32, 34 and the rail mount portions 50, 56 may not be fractured and the body 12 may plastically deformed.

Figure 7:
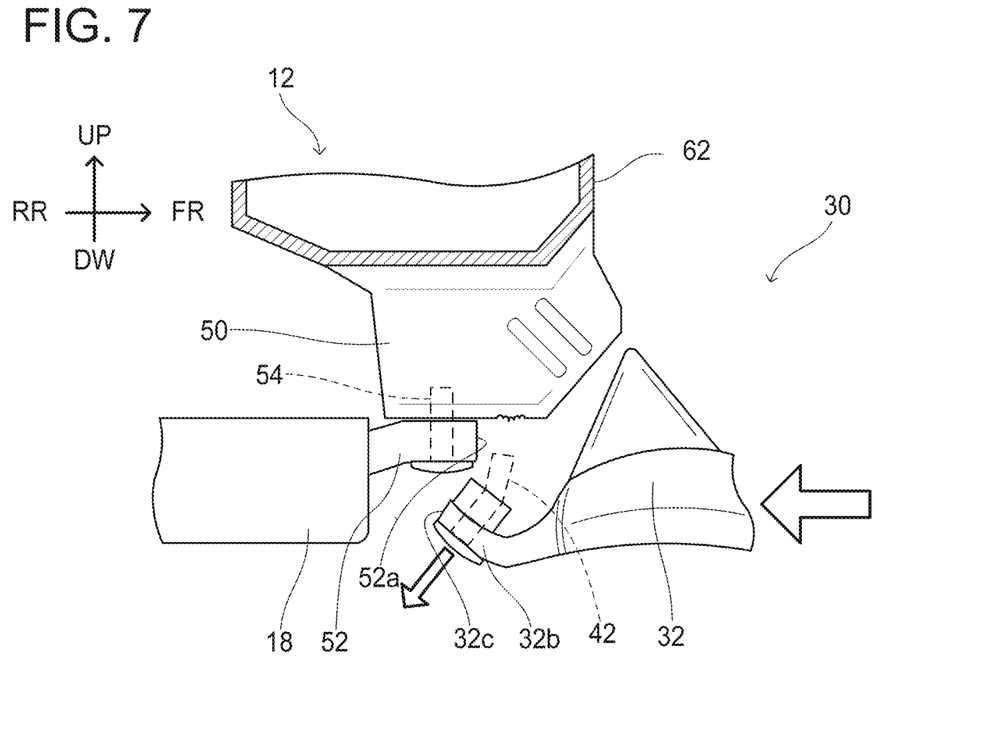
FIG. 7 schematically shows how the rear end 32b of the right side rail 32 behaves after having separated from the first rail mount portion 50 of the body 12.

With regard to the above, in the electric powered vehicle 10 according to the present embodiment, the rear ends 32*b*, 34*b* of the side rails 32, 34 of the subframe 30 are secured to the rail mount portions 50, 56 of the body 12, and the brackets 52, 58 of the battery unit 18 are also secured to the rail mount portions 50, 56. In this configuration, the rail mount portions 50, 56 of the body 12 are supported by the brackets 52, 58 of the battery unit 18, by which the strength of the body 12 at the rail mount portions 50, 56 can be substantially increased. Thus, as shown in FIG. 7, upon a frontal collision to the electric powered vehicle 10, the secured portions between the rear ends 32b, 34b of the side rails 32, 34 and the rail mount portions 50, 56 of the body 12 (e.g., portions where the bolts 42 are secured at the rail mount portions 50, 56) can easily fracture and the rear ends 32b, 34b of the side rails 32, 34 can be ensured to separate from the body 12. Since there is no need to make the rail mount portions 50, 56 of the body 12 robust, the weight of the body 12 is not increased and the battery unit 18 can be effectively protected from the subframe 30 upon a frontal collision.

Although not particularly limited, at least a part of the rear end face 32c of the side rail 32 and at least a prat of the rear end face 34c of the side rail 34 respectively face the front end face 52a of the bracket 52 and the front end face 58a of the bracket 58 of the battery unit 18 in the front-rear direction. In this configuration, the rear ends 32c, 34c of the side rails 32, 34 and the brackets 52, 58 of the battery unit 18 are arranged along the front-rear direction. Therefore, the brackets 52, 58 of the battery unit 18 can receive a large amount of collision load inputted to the rail mount portions 50, 56 from the side rails 32, 34. This substantially increases the strength of the rail mount portions 50, 56, and thus the rear ends 32b, 34b of the side rails 32, 34 can be ensured to separate from the body 12 upon a frontal collision to the electric powered vehicle 10.

As described, in the electric powered vehicle 10, the rear end faces 32c, 34c of the side rails 32, 34 of the subframe 30 are offset with respect to the brackets 52, 58 of the battery unit 18 in the down direction of the up-down directions. This configuration allows the rear ends 32b, 34b of the side rails 32, 34 that have separated from the rail mount portions 50, 56 of the body 12 to contact the brackets 52, 58 of the battery unit 18, by which the rear ends 32b, 34b of the side rails 32, 34 are deflected below the battery unit 18. Below the battery unit 18, there is a space between the electric powered vehicle 10 and a road surface. Since the rear ends 32b, 34b of the side rails 32, 34 are guided to that space, secondary damage which could be caused by the separation of the side rails 32, 34 can be avoided. In another embodiment, the rear end faces 32c, 34c of the side rails 32, 34 may be offset with respect to the front end faces 52a, 58a of the brackets 52, 58 in the up direction of the up-down directions.

As described, in the electric powered vehicle 10, the rear end faces 32c, 34c of the side rails 32, 34 of the subframe 30 are offset outward with respect to the front end faces 52a, 58a of the brackets 52, 58 of the battery unit 18 in the right-left directions. This configuration allows the rear ends 32b, 34b of the side rails 32, 34 that have separated from the rail mount portions 50, 56 of the body 12 to contact the brackets 52, 58 of the battery unit 18, by which the rear ends 32b, 34b of the side rails 32, 34 are deflected toward the outside of the electric powered vehicle 10. Major frame members of the body 12, such as side sills (also called rockers), are disposed on outer right and left sides of the battery unit 18. Therefore, in the configuration where the rear end faces 32c, 34c of the side rails 32, 34 are offset outward with respect to the front end faces 52a, 58a of the brackets 52, 58 in the right-left directions, the major frame members of the body 12, such as the side sills, can receive a collision load inputted to the body 12 from the rear ends 32b, 34b of the side rails 32, 34. In another embodiment, the rear end faces 32c, 34c of the side rails 32, 34 may be offset inward with respect to the front end faces 52a, 58a of the brackets 52, 58 in the right-left directions.

An area of a part of each of the rear end faces 32c, 34c of the side rails 32, 34 of the subframe 30 that faces corresponding one of the front end faces 52a, 58a of the brackets 52, 58 of the battery unit 18 in the front-rear directions may be at most a half of a total area of the rear end face 32c, 34c, although not limited so. In this positional relationship, the rear ends, 34b of the side rails 32, 34 partially contact the brackets 52, 58 when moving rearward (i.e., moving toward the battery unit 18), by which the rear ends 32b, 34b of the side rails 32, 34 can be significantly deflected from the battery unit 18. The aforementioned area of a part of each of the rear end face 32c, 34c that faces corresponding one of the front end faces 52a, 58a may be at most a quarter or one-eighth of the total area of the rear end face 32c, 34c.

As shown in FIGS. 3 and 5, the rear ends 32b, 34b of the side rails 32, 34 of the subframe 30 may be thinner than other parts of the side rails 32, 34. This configuration facilitates deformation of the rear ends 32b, 34b of the side rails 32, 34 upon a frontal collision to the electric powered vehicle 10, thus deformation of the rail mount portions 50, 56 of the body 12 can be mitigated. Therefore, the secured portions (i.e., the bolts 42) between the rear ends 32b, 34b of the side rails 32, 34 and the rail mount portions 50, 56 of the body 12 can easily fracture and the rear ends 32b, 34b of the side rails 32, 34 can be ensured to separate from the body 12.

In the electric powered vehicle 10 according to the present embodiment, the rear ends 32b, 34b of the side rails 32, 34 of the subframe 30 are secured to the rail mount portions 50, 56 of the body 12 with the bolts 42, although not limited so. Further, the collars 44 through which the bolts 42 passes are provided between the rear ends 32b, 34b of the side rails 32, 34 and the rail mount portions 50, 56 of the body 12. With this configuration, when the subframe 30 moves rearward due to a frontal collision to the electric powered vehicle 10, a relatively large force may locally be applied to the portions where the bolts 42 are secured at the rail mount portions 50, 56. Therefore, the secured portions between the rear ends 32b, 34b of the side rails 32, 34 and the rail mount portions 50, 56 of the body 12 (especially the portions where the bolts 42 are secured at the rail mount portions 50, 56) can be ensured to fracture.

In the electric powered vehicle 10 according to the present embodiment, the rail mount portions 50, 56 of the body 12 are disposed on a dash crossmember 62 of the body 12, although not limited so. The dash crossmember 62 is one of members (components) configuring the frame of the body 12, and extends in the right-left directions along a dash panel (not shown) that separates the cabin 12c from the front body 12f. The rail mount portions 50, 56 may be integrated with the dash crossmember 62 or may be attached to the dash crossmember 62, for example, by welding. In another embodiment, the rail mount portions 50, 56 may be disposed on another part different from the dash crossmember 62 of the body 12.

What is claimed is:

1. An electric powered vehicle including a traction motor, comprising:
   a body comprising a cabin and a front body;
   a subframe mounted at a lower portion of the front body and supporting a suspension along with the front body; and
   a battery unit mounted at a lower portion of the cabin and configured to supply electric power to the traction motor, wherein
the subframe comprises a side rail extending in front-rear directions of the electric powered vehicle and is secured to a rail mount portion of the body at a rear end of the side rail,
the battery unit comprises a bracket projecting in a front direction of the front-rear directions and is secured to the rail mount portion of the body at the bracket,
at least a part of a rear end face of the said rail of the subframe faces a front end face of the bracket of the battery unit in the front-rear directions, and
the rear end face of the side rail of the subframe is offset with respect to the front end face of the bracket of the battery unit in a down direction of up-down directions of the electric powered vehicle.

2. The electric powered vehicle according to claim 1, wherein the rear end face of the side rail of the subframe is offset with respect to the front end face of the bracket of the battery unit at least in either one of a right direction or a left direction of right-left directions of the electric powered vehicle.

3. The electric powered vehicle according to claim 2, wherein the rear end face of the side rail of the subframe is offset outward with respect to the front end face of the bracket of the battery unit in the one of the right direction or the left direction of the right-left directions.

4. The electric powered vehicle according to claim 1, wherein an area of a part of the rear end face of the side rail of the subframe that faces the front end face of the bracket of the battery unit in the front-rear directions is at most a half of a total area of the rear end face.

5. The electric powered vehicle according to claim 1, wherein the rear end of the side rail of the subframe is thinner than other part of the side rail.

6. The electric powered vehicle according to claim 1, wherein
the rear end of the side rail of the subframe is secured to the rail mount portion of the body with a bolt, and
a tubular spacer through which the bolt passes is provided between the rear end of the side rail of the subframe and the body.

7. The electric powered vehicle according to claim 1, wherein the rail mount portion of the body is disposed on a dash crossmember of the body.

8. An electric powered vehicle including a traction motor, comprising:
a body comprising a cabin and a front body;
a subframe mounted at a lower portion of the front body and supporting a suspension along with the front body; and
a battery unit mounted at a lower portion of the cabin and configured to supply electric power to the traction motor,
wherein
the subframe comprises a side rail extending in front-rear directions of the electric powered vehicle and is secured to a rail mount portion of the body at a rear end of the side rail,
the battery unit comprises a bracket projecting in a front direction of the front-rear directions and is secured to the rail mount portion of the body at the bracket,
at least a part of a rear end face of the side rail of the subframe faces a front end face of the bracket of the battery unit in the front-rear directions, and
the rear end face of the side rail of the subframe is offset with respect to the front end face of the bracket of the battery unit at least in either one of a right direction or a left direction of right-left directions of the electric powered vehicle.

9. The electric powered vehicle according to claim 8, wherein the rear end face of the side rail of the subframe is offset outward with respect to the front end face of the bracket of the battery unit in the one of the right direction or the left direction of the right-left directions.

10. The electric powered vehicle according to claim 8, wherein an area of a part of the rear end face of the side rail of the subframe that faces the front end face of the bracket of the battery unit in the front-rear directions is at most a half of a total area of the rear end face.

11. The electric powered vehicle according to claim 8, wherein the rear end of the side rail of the subframe is thinner than other part of the side rail.

12. The electric powered vehicle according to claim 8, wherein
the rear end of the side rail of the subframe is secured to the rail mount portion of the body with a bolt, and
a tubular spacer through which the bolt passes is provided between the rear end of the side rail of the subframe and the body.

13. The electric powered vehicle according to claim 8, wherein the rail mount portion of the body is disposed on a dash crossmember of the body.

14. An electric powered vehicle including a traction motor, comprising:
a body comprising a cabin and a front body;
a subframe mounted at a lower portion of the front body and supporting a suspension along with the front body; and
a battery unit mounted at a lower portion of the cabin and configured to supply electric power to the traction motor,
wherein
the subframe comprises a side rail extending in front-rear directions of the electric powered vehicle and is secured to a rail mount portion of the body at a rear end of the side rail,
the battery unit comprises a bracket projecting in a front direction of the front-rear directions and is secured to the rail mount portion of the body at the bracket, and
the rear end of the side rail of the subframe is thinner than other part of the side rail.

15. The electric powered vehicle according to claim 14, wherein
the rear end of the side rail of the subframe is secured to the rail mount portion of the body with a bolt, and
a tubular spacer through which the bolt passes is provided between the rear end of the side rail of the subframe and the body.

16. The electric powered vehicle according to claim 14, wherein the rail mount portion of the body is disposed on a dash crossmember of the body.

* * * * *